(12) United States Patent
Calciu et al.

(10) Patent No.: US 11,240,167 B2
(45) Date of Patent: Feb. 1, 2022

(54) ENERGY EFFICIENT OPTIMIZATION FOR SPANNING TREE PROTOCOL

(71) Applicant: LENOVO Enterprise Solutions (Singapore) PTE. LTD., New Tech Park (SG)

(72) Inventors: Corneliu-Ilie Calciu, Bucharest (RO); Radu M. Iorga, Bucharest (RO); George-Andrei Stanescu, Ilfov (RO); Bogdan Chifor, Nojorid (RO)

(73) Assignee: Lenovo Enterprise Solutions (Singapore) PTE. LTD., New Tech Park (SG)

(*) Notice: Subject to any disclaimer, the term of this patent is extended or adjusted under 35 U.S.C. 154(b) by 102 days.

(21) Appl. No.: 16/914,691

(22) Filed: Jun. 29, 2020

(65) Prior Publication Data
US 2021/0409340 A1    Dec. 30, 2021

(51) Int. Cl.
*H04L 12/863* (2013.01)
*H04L 12/24* (2006.01)

(52) U.S. Cl.
CPC .............. *H04L 47/62* (2013.01); *H04L 41/12* (2013.01)

(58) Field of Classification Search
CPC ................................ H04L 47/62; H04L 41/12
See application file for complete search history.

(56) References Cited

U.S. PATENT DOCUMENTS

| | | | | |
|---|---|---|---|---|
| 8,730,963 B1* | 5/2014 | Grosser, Jr | ............ | H04L 45/245 370/392 |
| 2004/0081171 A1* | 4/2004 | Finn | ........................ | H04L 45/48 370/395.53 |
| 2009/0185571 A1* | 7/2009 | Tallet | .................. | H04L 12/4625 370/401 |
| 2010/0226260 A1* | 9/2010 | Zinjuvadia | .............. | H04L 45/00 370/248 |
| 2012/0008530 A1* | 1/2012 | Kulkarni | ................. | H04L 12/42 370/256 |
| 2014/0169155 A1* | 6/2014 | Li | ........................ | H04L 43/0811 370/223 |

* cited by examiner

*Primary Examiner* — Duc C Ho
(74) *Attorney, Agent, or Firm* — Kunzler Bean & Adamson; Bruce R. Needham (57) ABSTRACT

An apparatus for optimization for Spanning Tree Protocol ("STP") data network includes an egress filter setting circuit in a first network node that sets an egress filter to discard data packets at an egress port of the first network node connected to a second network node in response to receiving an egress filter bridge protocol data unit ("BPDU") message from the second network node indicating that a link between the first network node and the second network node is a redundant link. The network nodes are layer-2 STP bridges. The apparatus includes, in the first network node, an egress filter timeout circuit that resets a timer in response to receiving the egress filter BPDU message, and a filter clear circuit that clears the egress filter to allow data packets to be sent from the egress port to the second network node in response to the timer reaching a timeout.

20 Claims, 5 Drawing Sheets

| Protocol Identifier -2 bytes | Version -1 byte | Message Type -1 byte | Flags -1 byte | Root ID -8 bytes | Root Path Cost -4 bytes | Bridge ID -8 bytes | Port ID -2 bytes | Message Age -2 bytes | Max. Age -2 bytes | Hello Time -2 bytes | Forward Delay -2 bytes |

ENERGY EFFICIENT OPTIMIZATION FOR SPANNING TREE PROTOCOL

FIELD

The subject matter disclosed herein relates to data networks with Spanning Tree Protocol ("STP") and more particularly relates to energy efficient optimization for data networks with STP.

BACKGROUND

STP is used for a long time to handle the network redundancy at the Layer-2 level. Even if other alternatives are available, STP is still widely employed due to its robustness and ease of use and also because of the interoperability with legacy networks. Energy Efficient Ethernet implemented with the Institute of Electrical and Electronics Engineers ("IEEE") 802.3az standard is an enhancement for reducing power consumption during links low utilization periods while preserving the interoperability with the legacy equipment. The Energy Efficient Ethernet solution is efficient only on the networks having idle intervals without customer traffic. This approach does not solve the problem of inefficient usage of redundant links for busy networks, especially in datacenters.

BRIEF SUMMARY

An apparatus for energy optimization for a data network using STP is disclosed. Another apparatus and a method also perform the functions of the apparatus. The apparatus includes an egress filter setting circuit in a first network node that is configured to set an egress filter to discard data packets at an egress port of the first network node connected to an ingress port of a second network node in response to receiving an egress filter bridge protocol data unit ("BPDU") message from the second network node indicating that a link between the first network node and the second network node is a redundant link. The first and second network nodes are layer-2 bridges running STP. The apparatus includes an egress filter timeout circuit in the first network node that is configured to reset a filter timer in response to receiving the egress filter BPDU message, and a filter clear circuit in the first network node that is configured to clear the egress filter to allow data packets to be sent from the egress port to the ingress port of the second network node in response to the filter timer reaching a filter timeout.

Another apparatus for energy optimization for a data network using STP includes in a second network node that is configured to set an ingress port in a link between the second network node and a first network node as a redundant port in response to receiving a configuration BPDU message indicating that the link between the second network node and the first network node is a redundant link for data packets received from a first network node. The first and second network nodes are layer-2 bridges running STP. The apparatus includes an egress filter message circuit in the second network node that is configured to send an egress filter BPDU message to the first network node in response to the port role selection circuit receiving the configuration BPDU message indicating that the link between the second network node and the first network node is a redundant link. The apparatus includes an egress message resend circuit in the second network node that is configured to periodically resend the BPDU message to the first network node.

A method for energy optimization for a data network using STP includes setting, in a first network node, an egress filter to discard data packets at an egress port of the first network node connected to an ingress port of a second network node in response to receiving an egress filter BPDU message from the second network node indicating that a link between the second network node and the first network node is a redundant link. The first and second network nodes are layer-2 bridges running STP. The method includes resetting, in the first network node, a filter timer in response to receiving the egress filter BPDU message, and clearing, in the first network node, the egress filter to allow data packets to be sent from the egress port to the ingress port of the second network node in response to the filter timer reaching a filter timeout.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or "Flash memory"), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

An apparatus for energy optimization for a data network using STP is disclosed. Another apparatus and a method also perform the functions of the apparatus. The apparatus includes an egress filter setting circuit in a first network node that is configured to set an egress filter to discard data packets at an egress port of the first network node connected to an ingress port of a second network node in response to receiving an egress filter bridge protocol data unit ("BPDU") message from the second network node indicating that a link between the first network node and the second network node is a redundant link. The first and second network nodes are layer-2 bridges running STP. The apparatus includes an egress filter timeout circuit in the first network node that is configured to reset a filter timer in response to receiving the egress filter BPDU message, and a filter clear circuit in the first network node that is configured to clear the egress filter to allow data packets to be sent from the egress port to the ingress port of the second network node in response to the filter timer reaching a filter timeout.

In some embodiments, the apparatus includes a port role selection circuit in the first network node that is configured to set an ingress port in a link between the first network node and a third network node as a redundant port in response to receiving a configuration BPDU message indicating that the link between the first network node and the third network node is a redundant link for data packets received from the third network node, and an egress filter message circuit in the first network node that is configured to send an egress filter BPDU message to the third network node in response to the port role selection circuit receiving the configuration BPDU message indicating that the link between the first network node and the third network node is a redundant link. In a further embodiments, the egress filter message circuit is configured to allow data packets to be received and processed without sending an egress filter BPDU message to the third network node in response to the configuration BPDU message indicating that the link between the first network node and the third network node is an active link for data packets received from the third network node. In other embodiments, the egress filter message circuit sets a message type field of the egress filter BPDU message to an egress discard value, where an egress filter setting circuit in the third network node, upon receipt of the egress filter BPDU message that includes the egress discard value in the message field, sets an egress port connected to the ingress port of the first network node to discard data packets being sent to the first network node.

In some embodiments, the filter clear circuit is further configured to clear the egress filter to allow data packets to be sent from the egress port to the ingress port of the second network node in response to receiving a topology change BPDU message. In other embodiments, the filter clear circuit is further configured to clear the egress filter to allow data packets to be sent from the egress port to the ingress port of the second network node in response to a link down event. In other embodiments, the egress filter setting circuit of the first network node is configured to read a message type field of the received egress filter BPDU message and in response to the message field of the received egress filter BPDU message including an egress discard value, discards data packets being sent to the second network node. The egress discard value is in a message type field of the egress filter BPDU message. In other embodiments, the egress filter setting circuit of the first network node further reads a bridge identifier ("ID") field of the egress filter BPDU message to determine that the second network node sent the egress filter BPDU message, where the egress filter setting circuit further identifies the egress port connected to the second network node for discarding data packets being sent from the egress port to an ingress port of the second network node.

Another apparatus for energy optimization for a data network using STP includes in a second network node that is configured to set an ingress port in a link between the second network node and a first network node as a redundant port in response to receiving a configuration BPDU message indicating that the link between the second network node and the first network node is a redundant link for data packets received from a first network node. The first and second network nodes are layer-2 bridges running STP. The apparatus includes an egress filter message circuit in the second network node that is configured to send an egress filter BPDU message to the first network node in response to the port role selection circuit receiving the configuration BPDU message indicating that the link between the second network node and the first network node is a redundant link. The apparatus includes an egress message resend circuit in the second network node that is configured to periodically resend the BPDU message to the first network node.

In some embodiments, the apparatus includes an egress filter setting circuit in the second network node that is configured to set an egress filter to discard data packets at an egress port of the second network node connected to an ingress port of a third network node in response to receiving an egress filter BPDU message from the third network node indicating that a link between the second network node and the third network node is a redundant link. In the embodiment, the apparatus includes an egress filter timeout circuit in the second network node that is configured to reset a filter timer in response to receiving the egress filter BPDU message. In the embodiment, the apparatus includes a filter clear circuit in the second network node that is configured to clear the egress filter to allow data packets to be sent from the egress port to the ingress port of the third network node in response to the filter timer reaching a filter timeout.

In some embodiments, the filter clear circuit is further configured to clear the egress filter to allow data packets to be sent from the egress port to the ingress port of the second network node in response to receiving a topology change BPDU message and/or a link down BPDU message. In other embodiments, the egress filter setting circuit of the second network node reads a message type field of the received egress filter BPDU message and in response to the message field of the received egress filter BPDU message including an egress discard value, discards data packets being sent to the third network node, wherein the egress discard value is in a message type field of the egress filter BPDU message.

In some embodiments, the egress filter message circuit is configured to allow data packets to be received and processed without sending an egress filter BPDU message to the first network node in response to the configuration BPDU message indicating that the link between the second network node and the first network node is an active link for data packets received from the first network node. In other embodiments, the egress filter message circuit sets a message type field of the egress filter BPDU message to an egress discard value, where an egress filter setting circuit in the first network node, upon receipt of the egress filter BPDU message that includes the egress discard value in the message field, sets an egress port connected to the ingress port of the second network node to discard data packets being sent to the second network node.

A method for energy optimization for a data network using STP includes setting, in a first network node, an egress filter to discard data packets at an egress port of the first network node connected to an ingress port of a second network node in response to receiving an egress filter BPDU message from the second network node indicating that a link between the first network node and the second network node is a redundant link. The first and second network nodes are layer-2 bridges running STP. The method includes resetting, in the first network node, a filter timer in response to receiving the egress filter BPDU message, and clearing, in the first network node, the egress filter to allow data packets to be sent from the egress port to the ingress port of the second network node in response to the filter timer reaching a filter timeout.

In some embodiments, the method includes setting an ingress port in a link between the first network node and a third network node as a redundant link in response to receiving a configuration BPDU message indicating that the link between the first network node and the third network node is a redundant link for data packets received from the third network node, and sending an egress filter BPDU message to the third network node in response to receiving the configuration BPDU message indicating that the link between the first network node and the third network node is a redundant link. In a further embodiment, the method includes allowing data packets to be received and processed without sending an egress filter BPDU message to the third network node in response to the configuration BPDU message indicating that the link between the first network node and the third network node is an active link for data packets received from the third network node. In other embodiments, the method includes setting a message type field of the egress filter BPDU message to an egress discard value. The third network node, upon receipt of the egress filter BPDU message including the egress discard value in the message field, sets an egress port connected to the ingress port of the first network node to discard data packets being sent to the first network node.

In some embodiments, the method includes clearing the egress filter to allow data packets to be sent from the egress port to the ingress port of the second network node in response to receiving a topology change BPDU message and/or link down event. In other embodiments, the method includes reading a message type field of the received egress filter BPDU message and in response to the message field of the received egress filter BPDU message including an egress discard value, discarding data packets being sent to the second network node, where the egress discard value is in a message type field of the egress filter BPDU message.

Figure 1A:
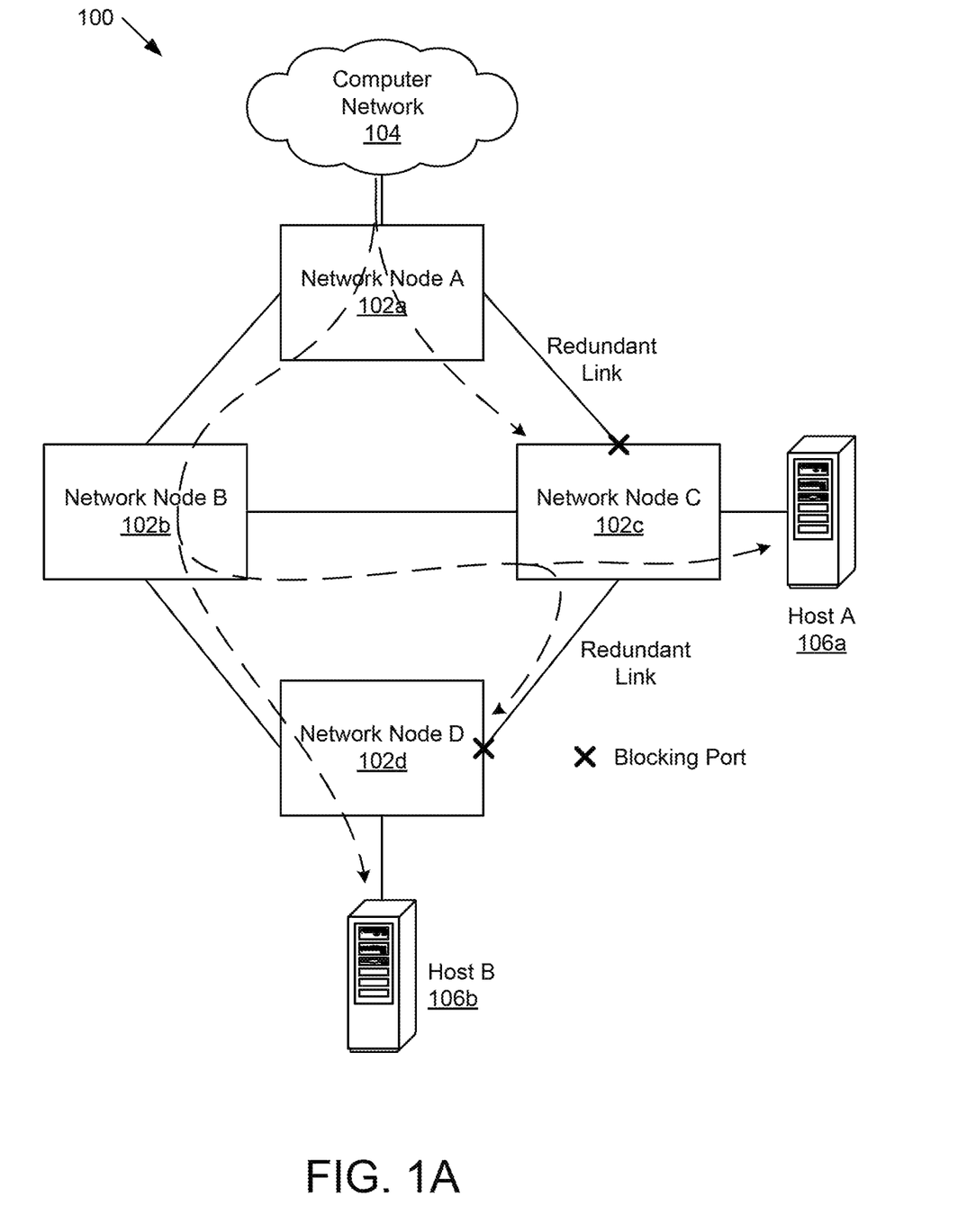
FIG. 1A is a schematic block diagram illustrating one embodiment of a data network with network nodes where data packets are sent to redundant ports.

FIG. 1A is a schematic block diagram illustrating one embodiment of a data network 100 with network nodes 102 where data packets are sent to redundant ports. The data network 100 includes four network nodes: network node A 102a, network node B 102b, network node C 102c and network node D 102d. Network node A 102a is connected to another computer network 104, which may include the Internet. Network node C 102c is connected to host A 106a and network node D 102d is connected to host B 106b. The network nodes 102a, 102b, 102c, 102d (collectively or generically "102") are all connected and a link between network node A 102a and network node C 102c is designated as a redundant link. Also, the link between network node C 102c and network node D 102d is a redundant link. The network nodes 102 use Spanning Tree Protocol ("STP"), which is a legacy networking protocol and is used to handle network redundancy at a Layer 2 level of the open systems interconnection ("OSI") model. STP is widely employed due to its robustness and ease of use and also because of the interoperability with legacy networks.

Current STP uses ingress ports of a network node 102 to filter packets sent to redundant ports. For example, when data packets are transmitted from the computer network 104 to host B 106b, network node A 102a is an ingress node and network node D 102d is an egress node while network nodes B and C 102b, 102c are both transit nodes where the links between network node A 102a and network node C 102c and the link between network node C 102c and network node D 102d are designated as redundant links and the links between network node A 102*a* and network node B 102*b* and the link between network node B 120*b* and network node D 102*d* are active links. The data flow (dashed lines) is then from the computer network 104, through network node A 102*a*, through network node B 102*b* and through network node D 102*d* to host B 106*b*. For data networks 100 using STP, data packets are sent from all egress ports of a network node 102 that connect to other network nodes 102 between a source and a destination of data packets. Data packets sent from network node A 102*a* to network node C 102*c* are dropped at the ingress port to network node C 102*c*, depicted as an "X," which is a blocking port. In addition, data packets sent from network node C 102*c* to network node D 102*d* are dropped at the ingress port of network node D 102*d*. This scheme requires processing by network node A 102*a* of the data packets dropped at network node C 102*c* and processing by network node C 102*c* of the data packets dropped at network node D 102*d*, which is inefficient.

The network nodes 102 are switches and/or routers that use the Spanning Tree Protocol ("STP") and transmit data packets at the Layer 2 level of the OSI model. STP was originally standardized using the Institute of Electrical and Electronics Engineers ("IEEE") 802.1D standard, but may include IEEE 802.1w, IEEE 802.1s, IEEE 802.1t or IEEE 802.1Q-2014. STP designates one network node 102 as a root bridge, which calculates costs of various routes where the costs are in terms of a highest bandwidth being a lowest cost. Once the route costs are calculated, the routes with the lowest cost are designated as preferred routes and redundant routes are blocked to prevent usage and to prevent circular routes. Ports connecting various network nodes 102 are root ports ("RP"), designated ports ("DP") or blocked ports ("BP"). Once a network node 102 is designated as the root bridge, the non-root bridge network nodes 102 have one port designated as a root port, which is an egress port that connects to the root bridge or, if there are several routes, the port that connects to the root bridge in a preferred route. Other ports are either designated ports or blocked ports.

The root bridge is not directly connected to all network nodes 102 so the network nodes 102 communicate using STP Bridge Protocol Data Units ("BPDUs"). Each network node 102 adds its own cost to the cost received from neighboring network nodes 102 to determine the total cost of a given route to the root bridge. Once all of the costs are calculated for the various routes, the root bridge determines which route is a preferred route and each network node 102 assigns a port as a root port which connects to the route with the lowest cost (highest bandwidth) that will lead directly or indirectly to the root bridge. For a particular link between two network nodes 102 that is part of a preferred route, a root port on one network node 102 connects to a dependent port on the other network node 102. For a non-preferred route, a port that receives packets from an upstream port is designated as a blocked port. However, this results in data packets being transmitted to a blocked port and dropped.

Figure 1B:
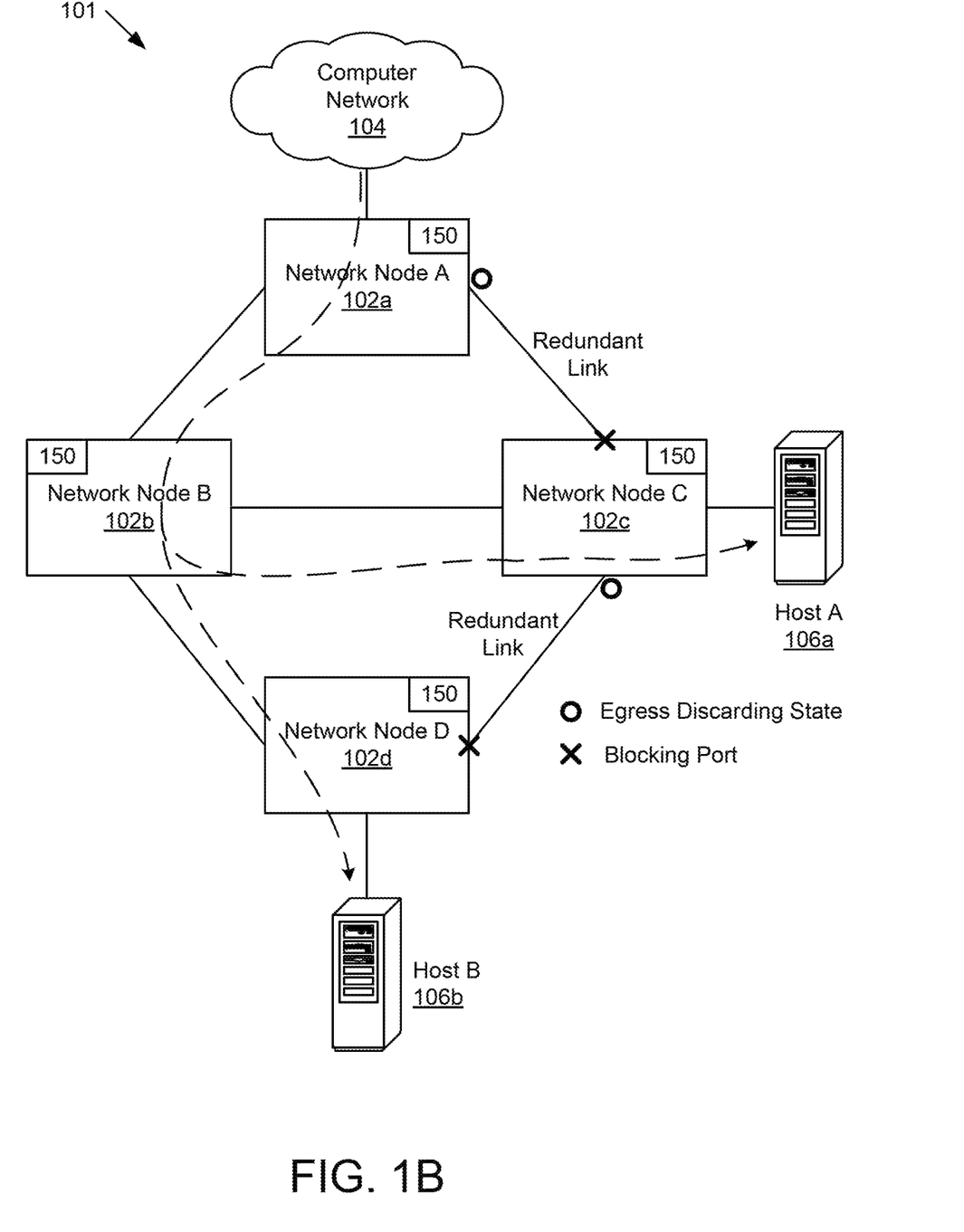
FIG. 1B is a schematic block diagram illustrating one embodiment of a data network with network nodes where data packets are not sent to redundant ports.

The computer network 104 is a representation of a computer network external to the data networks 100, 101 connected by the network nodes 102. In one embodiment, the computer network 104 includes the Internet or other external network. The computer network 104 is merely representative of a destination or source of data packets being transmitted through the data networks 100, 101. The hosts 106 are also representative of destinations or sources of data packets. The hosts 106 are computing devices and may include a rack-mounted computer, a server, a desktop computer, a laptop computer, a mainframe computer, a cloud server, etc. The hosts 106 and computer network 104 may be replaced or switched with other computing devices and/or networks and merely represent sources and/or destinations of data packets being transmitted through the STP network nodes 102. While four network nodes 102 are depicted, other data networks include a different amount of network nodes 102 in various configurations and the embodiments described herein are applicable to the various configurations.

FIG. 1B is a schematic block diagram illustrating one embodiment of a data network 101 with network nodes 102 where data packets are not sent to redundant ports. The data network 101 in FIG. 1B is the same as the data network 100 in FIG. 1B except that data packets are allowed to flow from network node A 102*a* to network node B 102*b*, but an egress port in network node A 102*a* connected to network node C 102*c* is in an egress discarding state. Thus, data packets being transmitted from the computer network 104 to host B 106*b* are not transmitted from the egress port in network node A 102*a* in the egress discarding state, but are instead discarded at the egress port. Likewise, the egress port in network node C 102*c* connected to network node D 102*d* is in an egress discarding state so data packets within network node C 102*c* that are from the computer network 104 and intended for host B 106*b* are prevents are prevented from being sent. To facilitate prevention of sending packets to a blocking port, each of the network nodes 102 in the data network 101 of FIG. 1B include a node efficiency apparatus 150, which is described in more detail with regard to the apparatuses 200, 300 of FIGS. 2 and 3.

Figure 2:
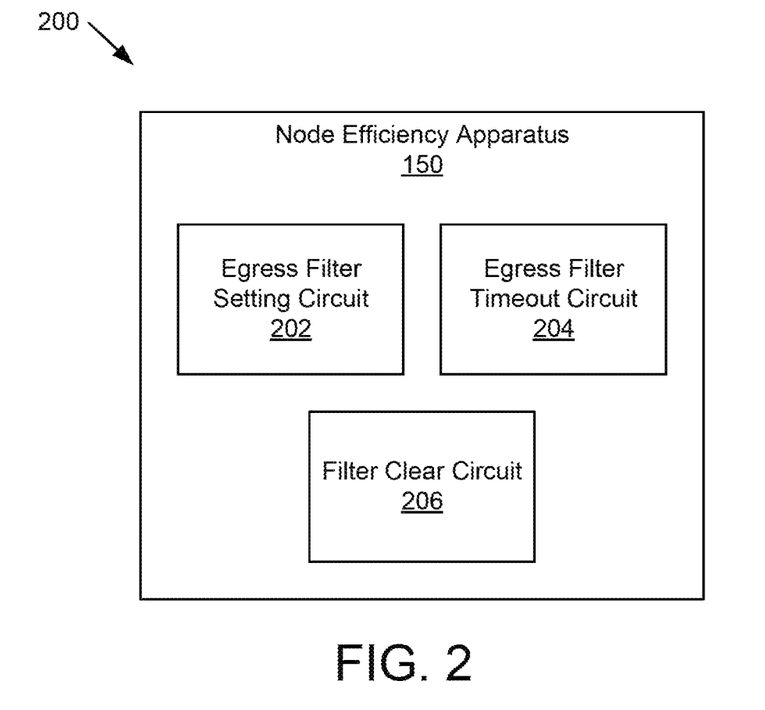
FIG. 2 is a schematic block diagram illustrating one embodiment of an apparatus for energy optimization for a data network using Spanning Tree Protocol ("STP")
Figure 5:
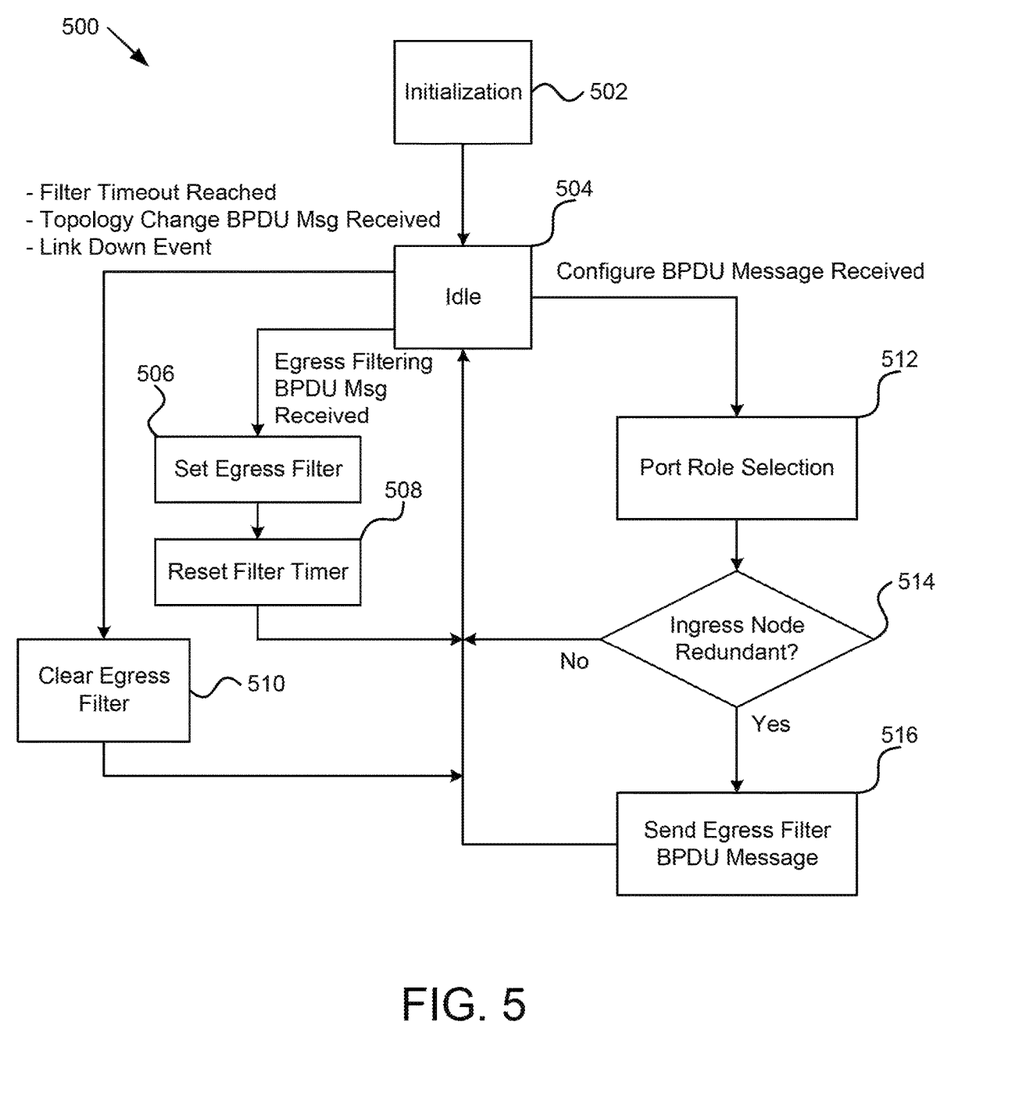
FIG. 5 is a schematic flow chart diagram illustrating one embodiment of a method for energy efficient optimization for data networks using STP.

FIG. 2 is a schematic block diagram illustrating one embodiment of an apparatus 200 for energy optimization for a data network 101 using Spanning Tree Protocol ("STP"). The apparatus 200 includes one embodiment of a node efficiency apparatus 150 that includes an egress filter setting circuit 202, an egress filter timeout circuit 204 and a filter clear circuit 206, which are described below. The node efficiency apparatus 150, in some embodiments, is implemented with hardware circuits. In some examples, node efficiency apparatus 150 is implemented as a state machine, as depicted in FIG. 5. In other embodiments, the node efficiency apparatus 150 is implemented using an application specific integrated circuit ("ASIC"). In other embodiments, the node efficiency apparatus 150 is implemented with a programmable hardware device, such as a field programmable gate array ("FPGA"), programmable array logic ("PAL"), and the like. In some embodiments, the node efficiency apparatus 150 is implemented with program code to be executed on a processor of a network node 102, which may be a processor customized for switches, routers, etc.

The apparatus 200 includes an egress filter setting circuit 202 in a first network node (e.g. network node C 102*c*) that is configured to set an egress filter to discard data packets at an egress port of the first network node (e.g. 102*c*) connected to an ingress port of a second network node (e.g. network node D 102*d*) in response to receiving an egress filter BPDU message from the second network node 102*d* indicating that a link between the first network node 102*c* and the second network node 102*d* is a redundant link for data packets transmitted from the first network node 102*c* to the second network node 102*d*. The first and second network nodes 102*c*, 102*d* are layer-2 bridges running STP.

Figure 4:
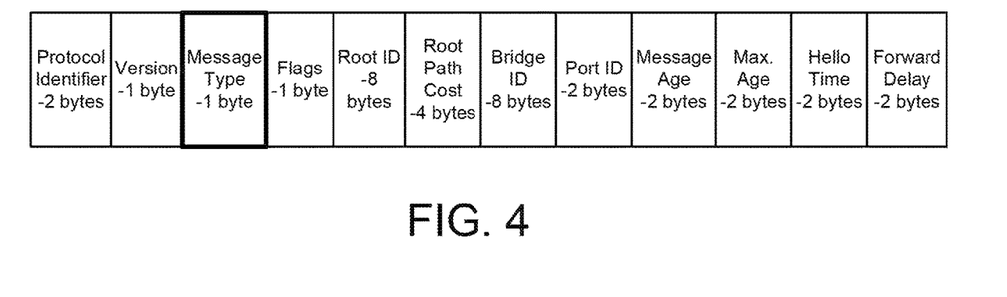
FIG. 4 is a schematic block diagram illustrating one embodiment of a bridge protocol data unit ("BPDU") frame format.

In some embodiments, the node efficiency apparatus 150 in the various network nodes 102 accomplishes discarding data packets at an egress port filter by customizing BPDU messages. In one example, the BPDU messages are customized by changing a message type field in a BPDU, as depicted in FIG. 4. FIG. 4 is a schematic block diagram illustrating one embodiment of a BPDU frame format that depicts the various fields in a BPDU message. The message type field is highlighted and is 1 byte.

In some embodiments, the egress filter setting circuit 202 of the first network node (e.g. 102*c*) is configured to read a message type field of the received egress filter BPDU message and in response to the message field of the received egress filter BPDU message having an egress discard value, discards data packets being sent to the second network node 102*d*. The egress discard value is in a message type field of the egress filter BPDU message. In other embodiments, the egress filter setting circuit 202 of the first network node 102*c* reads a bridge ID field of the egress filter BPDU message to determine that the second network node 102*d* sent the egress filter BPDU message. The egress filter setting circuit 202 also identifies the egress port connected to the second network node 102*c* for discarding data packets being sent from the egress port to an ingress port of the second network node 102*c*.

The node efficiency apparatus 150 changes the message type field and sends an egress filter BPDU message from the second network node (e.g. 102*d*) upstream to the first network node (e.g. 102*c*) so the egress filter setting circuit 202 reads the message field in the egress filter BPDU message and responds by setting the egress port to discard data packets sent to a downstream an ingress port in a blocking state of the second network node (e.g. 102*d*). This decreases the utilization of the ingress port of the second network node (e.g. 102*d*) so that unwanted traffic received at the physical layer ("PHY") and the media access control ("MAC") layer. The PHY layer is the layer-1 in the OSI stack and interfaces physical medium with MAC and upper layers. The MAC layer is the layer-2 in the OSI stack and interfaces the PHY layer and upper layers. Discarding unwanted data packets at the egress port of the first network node (e.g. 102*c*) saves power on the PHY and MAC layers of the downstream ingress port of the second network node (e.g. 102*d*).

The egress port of the first network node (e.g. 102*c*) being in the egress discard state also removes some processing on the egress port on the PHY and MAC layers because data packets of the particular preferred route are not sent on the egress port of the first network node (e.g. 102*c*). However, BPDU messages continue to flow through the egress port.

In some embodiments, the node efficiency apparatus 150 periodically sends egress filter BPDU messages to an upstream network node 102*c* where the node efficiency apparatus 150 is in a network node 102*c* with an ingress port set to a blocking state. For example, the node efficiency apparatus 150 may send the egress filter BPDU message every two seconds, every 5 seconds, every half second, or other period determined by one of skill in the art. The apparatus 200 includes an egress filter timeout circuit 204 that is configured to reset a filter timer in response to receiving the egress filter BPDU message. In some examples, the node efficiency apparatus 150 in the first network node 102*c* includes a filter timer and the egress filter timeout circuit 204 is configured to include a filter timeout, and when the egress filter timeout circuit 204 receives an egress filter BPDU message before the filter timer reaches the filter timeout, the egress filter timeout circuit 204 is configured to reset the filter timer and to wait for a next egress filter BPDU message.

The apparatus 200 includes a filter clear circuit 206 in the first network node 102*c* that is configured to clear the egress filter to allow data packets to be sent from the egress port of the first network node 102*c* to the ingress port of the second network node 102*d* in response to the filter timer reaching a filter timeout. For example, if the filter timeout is set to two seconds and the filter timer exceeds two seconds, the filter clear circuit 206 clears the egress filter to allow data packets to be sent to the ingress port of the second network node 102*d*. For example, the node efficiency apparatus 150 in the second network node 102*d* may receive a configuration BPDU message that makes the second network node 102*d* an active node. The node efficiency apparatus 150 then responds by stopping transmission of the egress filter BPDU messages.

The filter clear circuit 206 in the first network node 102*c*, in some embodiments, may also be configured to clear the egress filter for other reasons. In some embodiments, the filter clear circuit 206 is further configured to clear the egress filter to allow data packets to be sent from the egress port to the ingress port of the second network node 102*d* in response to receiving a topology change BPDU message. A topology change BPDU message may cause the first network node (e.g. 102*c*) to be an active node, may cause network nodes 102 to reset and recalculate transmission costs. In other embodiments, the filter clear circuit 206 is further configured to clear the egress filter to allow data packets to be sent from the egress port to the ingress port of the second network node 102*d* in response to a link down event. A link down event may be temporary and may cause a redundant port to become an active port on a temporary basis. In other embodiments, a link down event may lead to a change in topology and may result in a topology change BPDU message. One of skill in the art will recognize other reasons for the filter clear circuit 206 to clear the egress filter.

Figure 3:
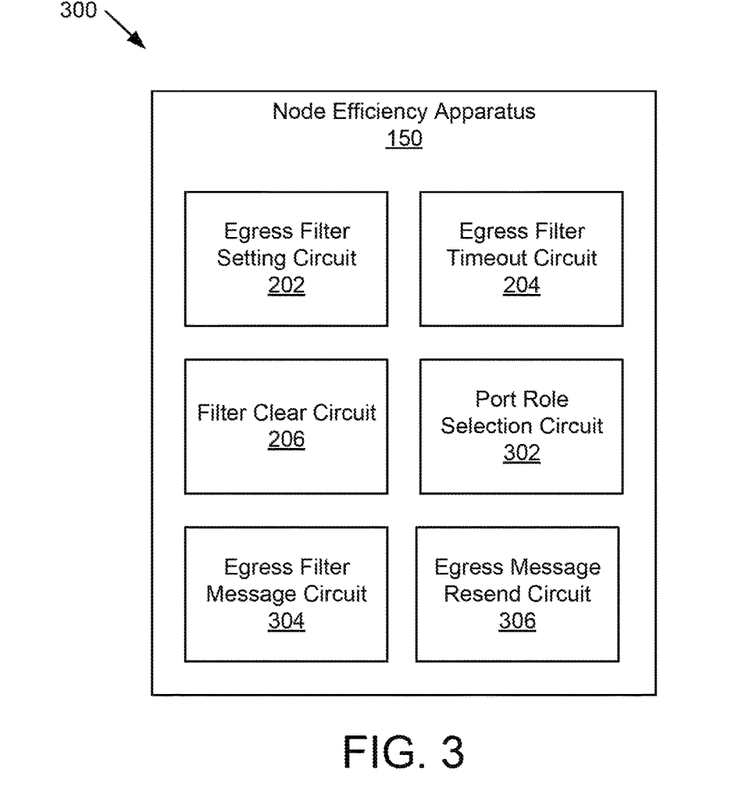
FIG. 3 is a schematic block diagram illustrating another embodiment of an apparatus for energy optimization for a data network using STP.

FIG. 3 is a schematic block diagram illustrating one embodiment of another apparatus 300 for energy optimization for a data network 101 using STP. The apparatus 300 includes another embodiment of the node efficiency apparatus 150 that includes an egress filter setting circuit 202, an egress filter timeout circuit 204 and a filter clear circuit 206, which are substantially similar to those described above in relation to the apparatus 200 of FIG. 2. In various embodiments, the apparatus 300 includes a port role selection circuit 302, an egress filter message circuit 304 and/or an egress message resend circuit 306, which are described below. The node efficiency apparatus 150 of the apparatus 300 in FIG. 3 may be implemented in similar ways to the node efficiency apparatus 150 of the apparatus 200 in FIG. 2.

The apparatus 300, in some embodiments, includes a port role selection circuit 302 in the first network node (e.g. 102*c*) that is configured to set an ingress port in a link between the first network node 102*c* and a third network node (e.g. network node A 102*a*) as a redundant port in response to receiving a configuration BPDU message indicating that the link between the first network node 102*c* and the third network node 102*a* is a redundant link for data packets received from the third network node 102*a*. The apparatus 300, in the embodiment, includes an egress filter message circuit 304 in the first network node 102*c* that is configured to send an egress filter BPDU message to the third network node (e.g. 102*a*) in response to the port role selection circuit 302 receiving the configuration BPDU message indicating that the link between the first network node 102*c* and the third network node 102*a* is a redundant link for data packets received from the third network node 102*a*.

In this embodiment, the role of the first network node 102*c* is reversed and sends the egress filter BPDU messages. The configuration BPDU message may occur at startup, may occur after a configuration change, may occur after a failure of a network node 102, etc. Typically, the configuration BPDU message originates at the root bridge and each network node 102 that receives a configuration BPDU message sends a configuration BPDU message. In some embodiments, a network node 102 that receives a configuration BPDU message creates a new configuration BPDU message to transmit to connected network nodes 102. One of skill in the art will recognize other ways that network nodes 102 receive and send configuration BPDU messages. The egress filter message circuit 304, in some embodiments, is configured to create an egress filter BPDU message using the BPDU frame format of FIG. 4 where the message type includes an egress discard value. In other embodiments, the bridge ID field of the egress filter BPDU message includes the ID of the first network node 102c.

In some embodiments, the apparatus 300 includes an egress message resend circuit 306 that is configured to periodically resend the BPDU message to the third network node 102a. For example, the egress message resend circuit 306 may resend the egress filter BPDU message every two seconds. In other embodiments, the egress message resend circuit 306 may resend the egress filter BPDU message at another rate. The egress message resend circuit 306 resending the egress filter BPDU message signals to an upstream network node 102 is a mechanism to allow maintaining the egress port of the upstream network node 102 to maintain the egress port in the egress discard state while receiving egress filter BPDU messages and to clear the egress filter in situations of a configuration change, a failure at a network node 102, when a network node 102 is temporarily down, etc.

FIG. 5 is a schematic flow chart diagram illustrating one embodiment of a method 500 for energy efficient optimization for data networks 101 using STP. The method 500 of FIG. 5, in some embodiments, is implemented with a state machine. A state machine is one way to implement the apparatuses 200, 300 of FIGS. 2 and 3.

The method 500 begins at initialization 502 an then enters and idle state 504 and the method 500 waits for a BPDU message. The method 500 sets 506 an egress filter to discard data packets at an egress port of the first network node 102c connected to an ingress port of a second network node (e.g. network node D 102d) in response to receiving an egress filter BPDU message from the second network node 102d indicating that a link between the first network node 102c and the second network node 102d is a redundant link for data packets transmitted from the first network node 102c to the second network node 102d. The first and second network nodes 102c, 102d are layer-2 bridges running STP. The method 500 resets 508 a filter timer in the first network node 102c in response to receiving the initial egress filter BPDU message and subsequent egress filter BPDU messages received before a filter timeout, and the method 500 returns to the idle state 504. Note that where the egress filter has been previously set 506, the method 500 may not need to set 506 the egress filter again.

The method 500 clears 510, in the first network node 102c, the egress filter to allow data packets to be sent from the egress port to the ingress port of the second network node 102d in response to the filter timer reaching a filter timeout, and the method 500 returns to the idle state 504. In other embodiments, the method 500 clears the egress filter in response to receiving a topology change BPDU message, a link down event, or the like, and the method 500 returns to the idle state 504.

If the method 500 receives, at the first network node 102c, a configuration BPDU message with a port role selection 512, the method determines 514 if the port role selection 512 includes that an ingress port in a link between the first network port 102c and a third network node (e.g. network node A 102a) is a redundant port for data packets sent from the third network node 102a to the first network node 102c. If the method 500 determines 514 that the port role selection 512 includes that the ingress port in the first network node 102c is a redundant port for data packets sent from the third network node 102a to the first network node 102c, the method 500 sends 516 an egress filter message to the third network node 102a and returns to the idle state 504. If the method 500 determines 514 that the port role selection 512 includes that the ingress port in the link between the first network node 102c and the third network node 102a is not a redundant port (e.g. is an active port) for data packets sent from the third network node 102a to the first network node 102c, the method 500 returns to the idle state 504. Note that the method 500 may be implemented in each network node 102 as a node efficiency apparatus 150, for example implemented as a state machine, ASIC, FPGA, etc.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
an egress filter setting circuit in a first network node that is configured to set an egress filter to discard data packets at an egress port of the first network node connected to an ingress port of a second network node in response to receiving an egress filter bridge protocol data unit ("BPDU") message from the second network node indicating that a link between the first network node and the second network node is a redundant link, wherein the first and second network nodes are layer-2 bridges running a spanning tree protocol ("STP");
an egress filter timeout circuit in the first network node that is configured to reset a filter timer in response to receiving the egress filter BPDU message; and
a filter clear circuit in the first network node that is configured to clear the egress filter to allow data packets to be sent from the egress port to the ingress port of the second network node in response to the filter timer reaching a filter timeout.

2. The apparatus of claim 1, further comprising:
a port role selection circuit in the first network node that is configured to set an ingress port in a link between the first network node and a third network node as a redundant port in response to receiving a configuration BPDU message indicating that the link between the first network node and the third network node is a redundant link for data packets received from the third network node; and
an egress filter message circuit in the first network node that is configured to send an egress filter BPDU message to the third network node in response to the port role selection circuit receiving the configuration BPDU message indicating that the link between the first network node and the third network node is a redundant link.

3. The apparatus of claim 2, wherein the egress filter message circuit is configured to allow data packets to be received and processed without sending an egress filter BPDU message to the third network node in response to the configuration BPDU message indicating that the link between the first network node and the third network node is an active link for data packets received from the third network node.

4. The apparatus of claim 2, wherein the egress filter message circuit sets a message type field of the egress filter BPDU message to an egress discard value, wherein an egress filter setting circuit in the third network node, upon receipt of the egress filter BPDU message comprising the egress discard value in the message field, sets an egress port connected to the ingress port of the first network node to discard data packets being sent to the first network node.

5. The apparatus of claim 1, wherein the filter clear circuit is further configured to clear the egress filter to allow data packets to be sent from the egress port to the ingress port of the second network node in response to receiving a topology change BPDU message.

6. The apparatus of claim 1, wherein the filter clear circuit is further configured to clear the egress filter to allow data packets to be sent from the egress port to the ingress port of the second network node in response to a link down event.

7. The apparatus of claim 1, wherein the egress filter setting circuit of the first network node is configured to read a message type field of the received egress filter BPDU message and in response to the message field of the received egress filter BPDU message comprising an egress discard value, discards data packets being sent to the second network node, wherein the egress discard value is in a message type field of the egress filter BPDU message.

8. The apparatus of claim 7, wherein the egress filter setting circuit of the first network node further reads a bridge identifier ("ID") field of the egress filter BPDU message to determine that the second network node sent the egress filter BPDU message, wherein the egress filter setting circuit further identifies the egress port connected to the second network node for discarding data packets being sent from the egress port to an ingress port of the second network node.

9. An apparatus comprising:
a port role selection circuit in a second network node that is configured to set an ingress port in a link between the second network node and a first network node as a redundant port in response to receiving a configuration bridge protocol data unit ("BPDU") message indicating that the link between the second network node and the first network node is a redundant link for data packets received from a first network node, wherein the first and second network nodes are layer-2 bridges running a spanning tree protocol ("STP");
an egress filter message circuit in the second network node that is configured to send an egress filter BPDU message to the first network node in response to the port role selection circuit receiving the configuration BPDU message indicating that the link between the second network node and the first network node is a redundant link; and
an egress message resend circuit in the second network node that is configured to periodically resend the BPDU message to the first network node.

10. The apparatus of claim 9, further comprising:
an egress filter setting circuit in the second network node that is configured to set an egress filter to discard data packets at an egress port of the second network node connected to an ingress port of a third network node in response to receiving an egress filter BPDU message from the third network node indicating that a link between the second network node and the third network node is a redundant link;
an egress filter timeout circuit in the second network node that is configured to reset a filter timer in response to receiving the egress filter BPDU message; and
a filter clear circuit in the second network node that is configured to clear the egress filter to allow data packets to be sent from the egress port to the ingress port of the third network node in response to the filter timer reaching a filter timeout.

11. The apparatus of claim 10, wherein the filter clear circuit is further configured to clear the egress filter to allow data packets to be sent from the egress port to the ingress port of the second network node in response to receiving a topology change BPDU message and/or a link down BPDU message.

12. The apparatus of claim 10, wherein the egress filter setting circuit of the second network node reads a message type field of the received egress filter BPDU message and in response to the message field of the received egress filter BPDU message comprising an egress discard value, discards data packets being sent to the third network node, wherein the egress discard value is in a message type field of the egress filter BPDU message.

13. The apparatus of claim 9, wherein the egress filter message circuit is configured to allow data packets to be received and processed without sending an egress filter BPDU message to the first network node in response to the configuration BPDU message indicating that the link between the second network node and the first network node is an active link for data packets received from the first network node.

14. The apparatus of claim 9, wherein the egress filter message circuit sets a message type field of the egress filter BPDU message to an egress discard value, wherein an egress filter setting circuit in the first network node, upon receipt of the egress filter BPDU message comprising the egress discard value in the message field, sets an egress port connected to the ingress port of the second network node to discard data packets being sent to the second network node.

15. A method comprising:
setting, in a first network node, an egress filter to discard data packets at an egress port of the first network node connected to an ingress port of a second network node in response to receiving an egress filter bridge protocol data unit ("BPDU") message from the second network node indicating that a link between the first network node and the second network node is a redundant link, wherein the first and second network nodes are layer-2 bridges running a spanning tree protocol ("STP");
resetting, in the first network node, a filter timer in response to receiving the egress filter BPDU message; and
clearing, in the first network node, the egress filter to allow data packets to be sent from the egress port to the ingress port of the second network node in response to the filter timer reaching a filter timeout.

16. The method of claim 15, further comprising:
setting an ingress port in a link between the first network node and a third network node as a redundant port in response to receiving a configuration BPDU message indicating that the link between the first network node and the third network node is a redundant link for data packets received from the third network node; and
sending an egress filter BPDU message to the third network node in response to receiving the configuration BPDU message indicating that the link between the first network node and the third network node is a redundant link.

17. The method of claim 16, further comprising allowing data packets to be received and processed without sending an egress filter BPDU message to the third network node in response to the configuration BPDU message indicating that the link between the first network node and the third network node is an active link for data packets received from the third network node.

18. The method of claim 16, further comprising setting a message type field of the egress filter BPDU message to an egress discard value, wherein the third network node, upon receipt of the egress filter BPDU message comprising the egress discard value in the message field, sets an egress port connected to the ingress port of the first network node to discard data packets being sent to the first network node.

19. The method of claim 15, further comprising clearing the egress filter to allow data packets to be sent from the egress port to the ingress port of the second network node in response to receiving a topology change BPDU message and/or link down event.

20. The method of claim 15, further comprising reading a message type field of the received egress filter BPDU message and in response to the message field of the received egress filter BPDU message comprising an egress discard value, discarding data packets being sent to the second network node, wherein the egress discard value is in a message type field of the egress filter BPDU message.

* * * * *